US010476649B2

(12) United States Patent
Kim et al.

(10) Patent No.: US 10,476,649 B2
(45) Date of Patent: Nov. 12, 2019

(54) METHOD FOR REPORTING CHANNEL QUALITY INFORMATION IN TDD TYPE WIRELESS COMMUNICATION SYSTEM, AND DEVICE THEREFOR

(71) Applicant: LG ELECTRONICS INC., Seoul (KR)

(72) Inventors: Hyungtae Kim, Seoul (KR); Bonghoe Kim, Seoul (KR); Jonghyun Park, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/516,793

(22) PCT Filed: Jan. 5, 2016

(86) PCT No.: PCT/KR2016/000051
§ 371 (c)(1),
(2) Date: Apr. 4, 2017

(87) PCT Pub. No.: WO2016/111521
PCT Pub. Date: Jul. 14, 2016

(65) Prior Publication Data
US 2017/0310449 A1  Oct. 26, 2017

Related U.S. Application Data

(60) Provisional application No. 62/100,854, filed on Jan. 7, 2015, provisional application No. 62/112,136, filed on Feb. 4, 2015.

(51) Int. Cl.
*H04L 5/00* (2006.01)
*H04L 5/14* (2006.01)
(Continued)

(52) U.S. Cl.
CPC .......... *H04L 5/0057* (2013.01); *H04B 7/0417* (2013.01); *H04B 7/063* (2013.01); *H04B 7/0632* (2013.01); *H04L 5/14* (2013.01)

(58) Field of Classification Search
CPC ...... H04B 7/06; H04B 7/0632; H04B 7/0456; H04L 5/0057; H04L 5/14; H04L 5/00
(Continued)

(56) References Cited

U.S. PATENT DOCUMENTS 8,553,614 B2 * 10/2013 Chun .................... H04L 1/0029
370/328
8,634,319 B2 *  1/2014 Kim ..................... H04B 7/0632
370/252
(Continued)

FOREIGN PATENT DOCUMENTS

WO  2012112281  8/2012

OTHER PUBLICATIONS

PCT International Application No. PCT/KR2016/000051, Notification of Transmittal of the International Search Report and the Written Opinion of the International Searching Authority, or Declaration dated Apr. 12, 2016, 18 pages.
(Continued)

*Primary Examiner* — Man U Phan
(74) *Attorney, Agent, or Firm* — Lee Hong Degerman Kang Waimey

(57) ABSTRACT

Disclosed is a method by which a terminal reports channel quality information (CQI) to a base station in a multi-antenna-based wireless communication system. Particularly, the method comprises the steps of: receiving, through an upper layer, the reference signal configuration defined by P number of antenna ports; receiving, through M number of antenna ports, reference signals from the base station; grouping the P number of antenna ports into antenna port groups
(Continued)

formed of the M number of antenna ports; calculating CQIs by using the reference signal corresponding to each of the antenna port groups on the basis of the assumption that predefined precoders are applied to the reference signals; and reporting, to the base station, N number of CQIs among the calculated CQIs.

21 Claims, 8 Drawing Sheets

(51) Int. Cl.
*H04B 7/06* (2006.01)
*H04B 7/0417* (2017.01)
(58) Field of Classification Search
USPC ......................................................... 370/280
See application file for complete search history.

(56) References Cited

U.S. PATENT DOCUMENTS

| | | | | |
|---|---|---|---|---|
| 8,953,699 B2* | 2/2015 | Sayana | ................. | H04B 7/024 |
| | | | | 370/252 |
| 9,178,583 B2* | 11/2015 | Nam | ..................... | H04B 7/0417 |
| 9,496,942 B2* | 11/2016 | Ko | ...................... | H04B 7/0486 |
| 9,509,383 B2* | 11/2016 | Kim | ..................... | H04B 7/0486 |
| 9,509,471 B2* | 11/2016 | Kim | ..................... | H04B 7/024 |
| 9,585,044 B2* | 2/2017 | Park | .................... | H04W 24/10 |
| 9,749,106 B2* | 8/2017 | Kim | ..................... | H04B 7/024 |
| 9,763,129 B2* | 9/2017 | Xia | ....................... | H04B 7/063 |
| 9,768,930 B2* | 9/2017 | Park | .................... | H04L 5/0014 |
| 9,787,450 B2* | 10/2017 | Kim | ..................... | H04B 7/0417 |
| 9,825,682 B2* | 11/2017 | Park | .................... | H04B 7/0413 |
| 9,838,184 B2* | 12/2017 | Kang | ................... | H04B 7/0626 |
| 9,872,242 B2* | 1/2018 | Xiao | .................... | H04B 7/0417 |
| 10,057,031 B2* | 8/2018 | Kim | ..................... | H04B 7/0417 |
| 10,075,218 B2* | 9/2018 | Rahman | ............... | H04B 7/0456 |
| 10,084,583 B2* | 9/2018 | Park | .................... | H04L 5/0014 |
| 10,341,080 B2* | 7/2019 | Wang | ................... | H04B 7/0417 |
| 2008/0013610 A1 | 1/2008 | Varadarajan et al. | | |
| 2008/0165710 A1* | 7/2008 | Parts | .................... | H04L 5/0048 |
| | | | | 370/280 |
| 2010/0254272 A1 | 10/2010 | Chun et al. | | |
| 2011/0243026 A1 | 10/2011 | Kim et al. | | |
| 2013/0114656 A1 | 5/2013 | Sayana et al. | | |
| 2013/0196675 A1 | 8/2013 | Xiao et al. | | |
| 2014/0133336 A1 | 5/2014 | Park et al. | | |
| 2014/0192917 A1 | 7/2014 | Nam et al. | | |
| 2015/0163039 A1* | 6/2015 | Davydov | ............ | H04W 72/042 |
| | | | | 370/329 |
| 2015/0249511 A1* | 9/2015 | Chen | ..................... | H04L 1/0026 |
| | | | | 370/252 |
| 2015/0327247 A1* | 11/2015 | Chen | ................. | H04W 52/0251 |
| | | | | 370/329 |
| 2016/0277090 A1* | 9/2016 | Kim | ..................... | H04B 7/0478 |
| 2017/0048740 A1* | 2/2017 | Yang | ....................... | H04B 7/26 |
| 2018/0054244 A1* | 2/2018 | Kim | ..................... | G01S 7/52095 |
| 2018/0248608 A1* | 8/2018 | Akoum | ................. | H04L 5/0048 |
| 2019/0007106 A1* | 1/2019 | Park | .................... | H04B 7/0417 |
| 2019/0044599 A1* | 2/2019 | Kakishima | ........... | H04B 17/327 |

OTHER PUBLICATIONS

European Patent Office Application Serial No. 16735142.8, Search Report dated Aug. 13, 2018, 11 pages.
European Patent Office Application Serial No. 19162725.6, Search Report dated Apr. 16, 2019, 8 pages.
CMCC, "Spec enhancement for reciprocity based operation", R1-144947, 3GPP TSG RAN WG1 Meeting #79, Nov. 2014, 5 pages.

\* cited by examiner

-- Prior Art --

FIG. 2
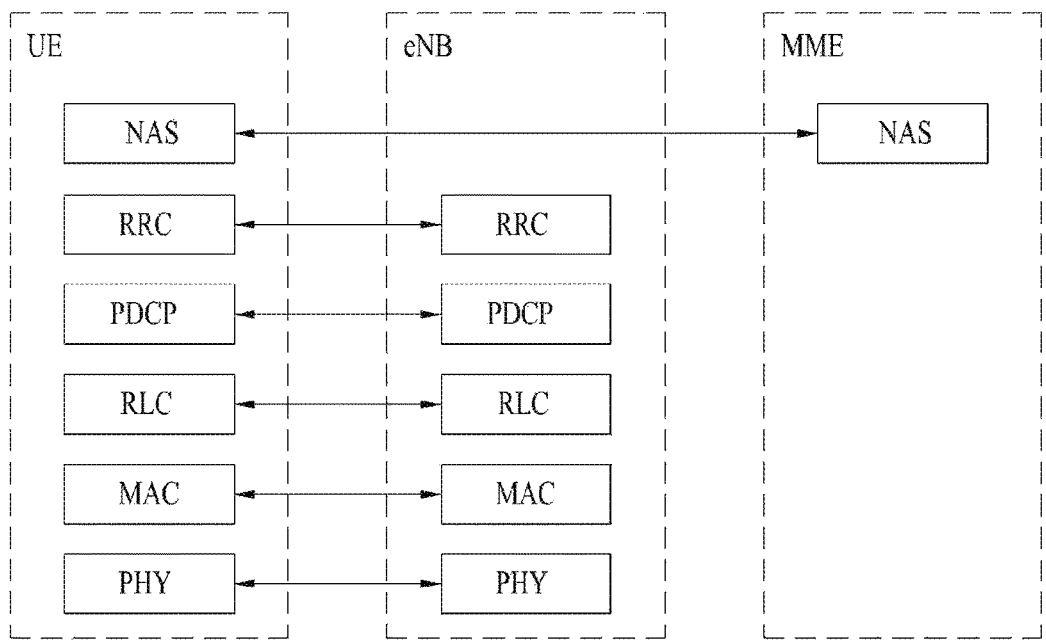
(A) CONTROL-PLANE PROTOCOL STACK
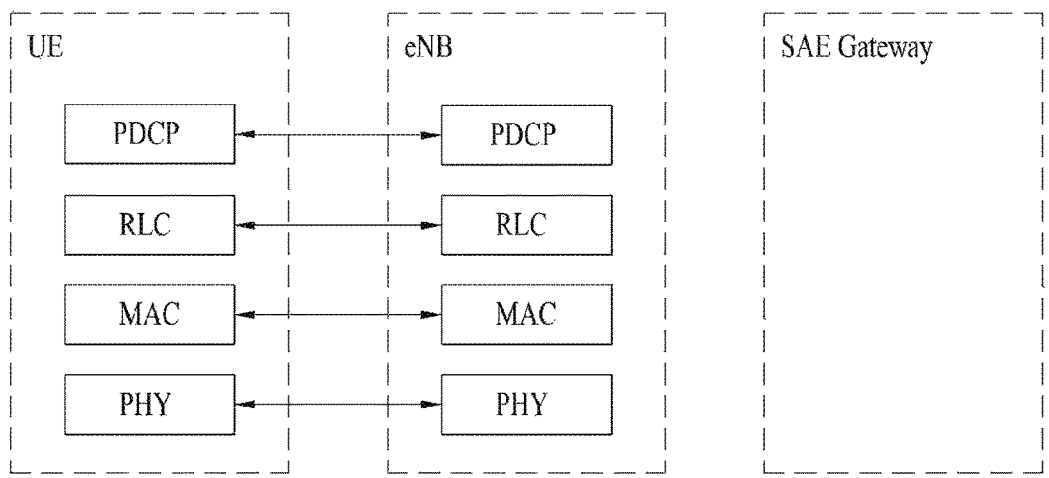
(B) USER-PLANE PROTOCOL STACK

METHOD FOR REPORTING CHANNEL QUALITY INFORMATION IN TDD TYPE WIRELESS COMMUNICATION SYSTEM, AND DEVICE THEREFOR

CROSS-REFERENCE TO RELATED APPLICATIONS

This application is the National Stage filing under 35 U.S.C. 371 of International Application No. PCT/KR2016/000051, filed on Jan. 5, 2016, which claims the benefit of U.S. Provisional Application No. 62/100,854, filed on Jan. 7, 2015 and 62/112,136, filed on Feb. 4, 2015, the contents of which are all hereby incorporated by reference herein in their entirety.

TECHNICAL FIELD

The present invention relates to a wireless communication system, and more particularly, to a method of reporting channel quality information in a TDD (Time Division Duplex) type wireless communication system and an apparatus therefor.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Based on the aforementioned discussion, a method of reporting channel quality information in a TDD type wireless communication system and an apparatus therefor are proposed in the following.

Technical Solution

To achieve these and other advantages and in accordance with the purpose of the present invention, as embodied and broadly described, according to one embodiment, a method of reporting CQI (Channel Quality Information), which is reported to an eNB by a user equipment in a multi-antenna based wireless communication system, includes the steps of receiving a reference signal configuration defined by P number of antenna ports via a higher layer, receiving a reference signal via M number of antenna ports from the eNB, grouping the P number of antenna ports by antenna port groups configured by the M number of antenna ports, calculating CQIs using a reference signal corresponding to each of the antenna port groups under the assumption that a predefined precoder is applied to the CQIs, and reporting N number of CQIs among the calculated CQIs to the eNB.

In this case, the method can further includes the step of transmitting information on the M corresponding to the number of antenna ports that construct each of the antenna groups to the eNB. And, the predefined precoder may correspond to a unit matrix of M×M size.

Preferably, the N number of CQIs reporting step can include the step of reporting information on an index of an antenna port corresponding to each of the N number of CQIs to the eNB.

More preferably, the N number of CQIs reporting step can include the step of selecting the N number of CQIs from among the calculated CQIs in an order of good channel quality.

To further achieve these and other advantages and in accordance with the purpose of the present invention, according to a different embodiment, a user equipment in a multi-antenna based wireless communication system includes a wireless communication module configured to transceive a signal with an eNB, and a processor configured to process the signal, the processor configured to receive a reference signal configuration defined by P number of antenna ports via a higher layer, the processor configured to receive a reference signal via M number of antenna ports from the eNB and group the P number of antenna ports by antenna port groups configured by the M number of antenna ports, the processor configured to calculate CQIs using a reference signal corresponding to each of the antenna port groups under the assumption that a predefined precoder is applied to the CQIs, the processor configured to control the wireless communication module to report N number of CQIs among the calculated CQIs to the eNB.

In this case, the processor is configured to control the wireless communication module to transmit information on the M corresponding to the number of antenna ports that construct each of the antenna groups to the eNB. And, the predefined precoder may correspond to a unit matrix of M×M size.

Preferably, the processor is configured to control the wireless communication module to transmit information on an index of an antenna port corresponding to each of the N number of CQIs to the eNB together with the N number of CQIs.

More preferably, the processor is configured to select the N number of CQIs from among the calculated CQIs in an order of good channel quality.

Preferably, the multi-antenna based wireless communication system may correspond to a TTD (Time Division Duplex) communication system in the aforementioned embodiments.

Advantageous Effects

According to embodiments of the present invention, a UE is able to efficiently report channel state information in a TDD type wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN).

BEST MODE

Mode for Invention

Figure 1:
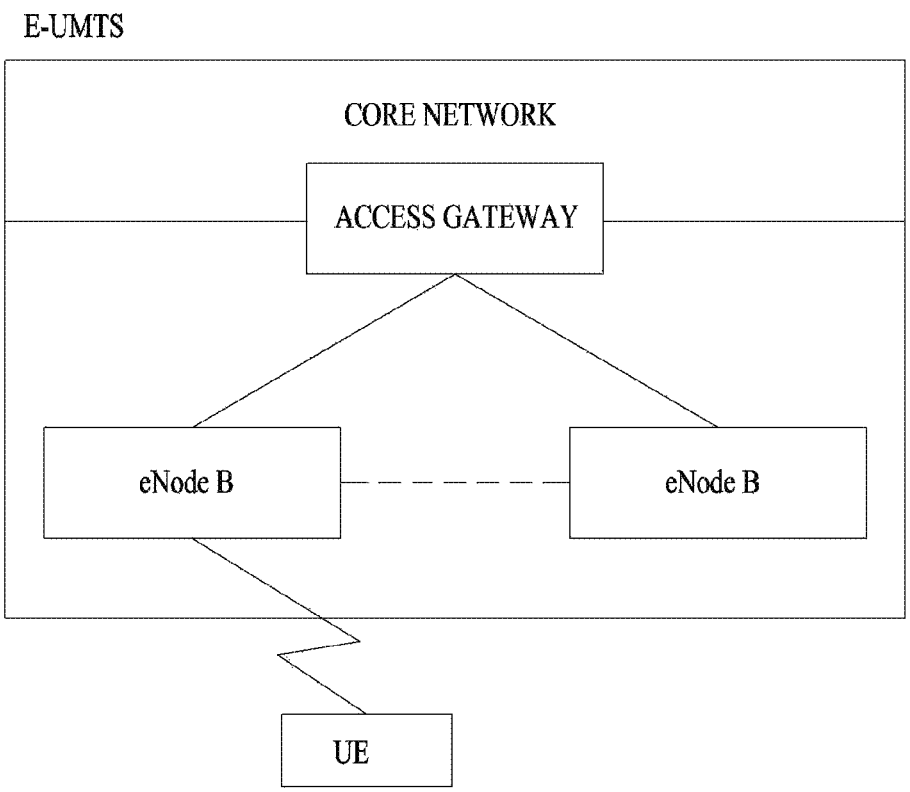
FIG. 1 illustrates a configuration of an Evolved Universal Mobile Telecommunications System (E-UMTS) network as an example of a wireless communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

FIG. 2 shows a control plane and a user plane of a radio interface protocol between a UE and an Evolved Universal Terrestrial Radio Access Network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a Medium Access Control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of a higher layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A Radio Resource Control (RRC) layer located at the bottom of a third layer is defined only in the control plane and is responsible for control of logical, transport, and physical channels in association with configuration, re-configuration, and release of Radio Bearers (RBs). The RB is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located above the RRC layer performs functions such as session management and mobility management.

One cell of the eNB is set to use a bandwidth such as 1.4, 3, 5, 10, 15 or 20 MHz to provide a downlink or uplink transmission service to UEs. Different cells may be set to provide different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
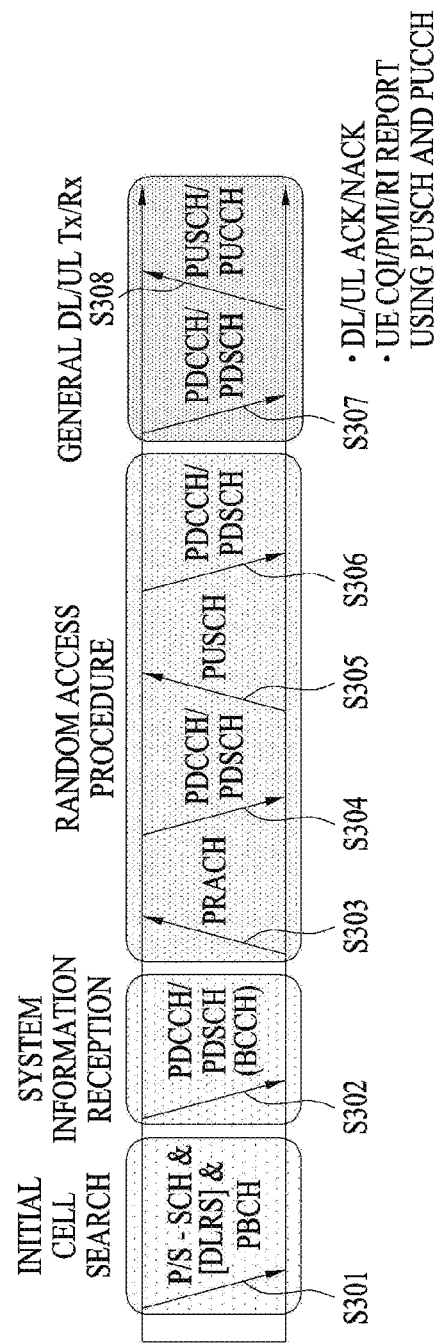
FIG. 3 illustrates physical channels and a general signal transmission method using the physical channels in a 3GPP system.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a Downlink Reference Signal (DL RS) so as to confirm a downlink channel state in the initial cell search step.

The UE, which has completed the initial cell search, may receive a Physical Downlink Control Channel (PDCCH) and a Physical Downlink Shared Channel (PDSCH) according to information included in the PDCCH so as to acquire more detailed system information (S302).

Meanwhile, if the eNB is initially accessed or radio resources for signal transmission are not present, the UE may perform a Random Access Procedure (RACH) (step S303 to S306) with respect to the eNB. In this case, the UE may transmit a specific sequence through a Physical Random Access Channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE, which has performed the above procedures, may perform PDCCH/PDSCH reception (S307) and Physical Uplink Shared Channel PUSCH)/Physical Uplink Control Channel (PUCCH) transmission (S308) as a general uplink/downlink signal transmission procedure. In particular, the UE receives downlink control information (DCI) through a PDCCH. Here, the DCI includes control information such as resource allocation information of the UE and the format thereof differs according to the use purpose.

The control information transmitted from the UE to the eNB in uplink or transmitted from the eNB to the UE in downlink includes a downlink/uplink ACK/NACK signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Figure 4:
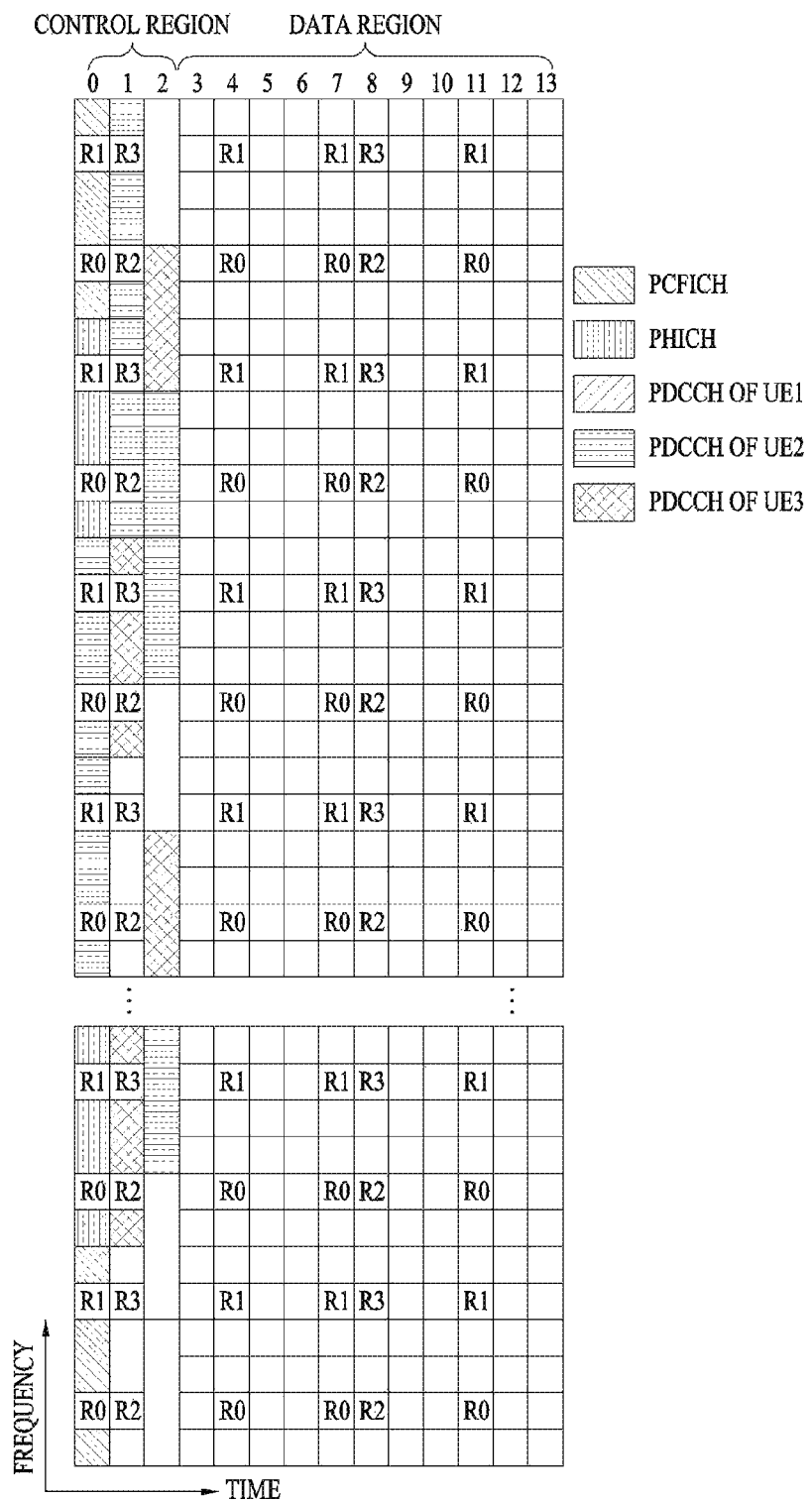
FIG. 4 illustrates a structure of a downlink radio frame in a Long Term Evolution (LTE) system.

FIG. 4 is a diagram showing a control channel included in a control region of one subframe in a downlink radio frame.

Referring to FIG. 4, a subframe includes 14 OFDM symbols. The first to third OFDM symbols are used as a control region and the remaining 13 to 11 OFDM symbols are used as a data region, according to subframe configuration. In FIG. 4, R1 to R4 denote reference signals (RS) or pilot signals for antennas 0 to 3. The RS is fixed to a constant pattern within a subframe regardless of the control region and the data region. A control channel is allocated to resources, to which the RS is not allocated, in the control region, and a traffic channel is also allocated to resources, to which the RS is not allocated, in the control region. Examples of the control channel allocated to the control region include a Physical Control Format Indicator Channel (PCFICH), a Physical Hybrid-ARQ Indicator Channel (PHICH), a Physical Downlink Control Channel (PDCCH), etc.

The Physical Control Format Indicator Channel (PCFICH) informs the UE of the number of OFDM symbols used for the PDCCH per subframe. The PCFICH is located at a first OFDM symbol and is configured prior to the PHICH and the PDCCH. The PCFICH includes four Resource Element Groups (REGs) and the REGs are dispersed in the control region based on a cell identity (ID). One REG includes four resource elements (REs). The PCFICH has a value of 1 to 3 or 2 to 4 according to bandwidth and is modulated using a Quadrature Phase Shift Keying (QPSK) scheme.

The Physical Hybrid-ARQ Indicator Channel (PHICH) is used to carry HARQ ACK/NACK for uplink transmission. That is, the PHICH refers to a channel via which DL ACK/NACK information for uplink HARQ is transmitted. The PHICH includes one REG and is scrambled on a cell-specific basis. ACK/NACK is indicated by one bit and is modulated using a binary phase shift keying (BPSK) scheme. The modulated ACK/NACK is repeatedly spread with a spreading factor (SF) of 2 or 4. A plurality of PHICHs mapped to the same resources configures a PHICH group. The number of PHICHs multiplexed in the PHICH group is determined according to the number of spreading codes. The PHICH (group) is repeated three times in order to obtain diversity gain in a frequency region and/or time region.

The Physical Downlink Control Channel (PDCCH) is allocated to the first n OFDM symbols of a subframe. Here, n is an integer of 1 or more and is indicated by a PCFICH. The PDCCH includes one or more Control Channel Elements (CCEs). The PDCCH informs each UE or a UE group of information associated with resource allocation of a Paging Channel (PCH) and a Downlink-Shared Channel (DL-SCH), both of which are transport channels, uplink scheduling grant, HARQ information, etc. The paging channel (PCH) and the downlink-shared channel (DL-SCH) are transmitted through a PDSCH. Accordingly, the eNB and the UE transmit and receive data through the PDSCH except for specific control information or specific service data.

Information indicating to which UE (one or a plurality of UEs) data of the PDSCH is transmitted and information indicating how the UEs receive and decode the PDSCH data are transmitted in a state of being included in the PDCCH. For example, it is assumed that a specific PDCCH is CRC-masked with a Radio Network Temporary Identity (RNTI) "A", and information about data transmitted using a radio resource (e.g., frequency location) "B" and transmission format information (e.g., transmission block size, modulation scheme, coding information, or the like) "C" is transmitted via a specific subframe. In this case, one or more UEs located within a cell monitor a PDCCH using its own RNTI information, and if one or more UEs having "A" RNTI are present, the UEs receive the PDCCH and receive the PDSCH indicated by "B" and "C" through the information about the received PDCCH.

Figure 5:
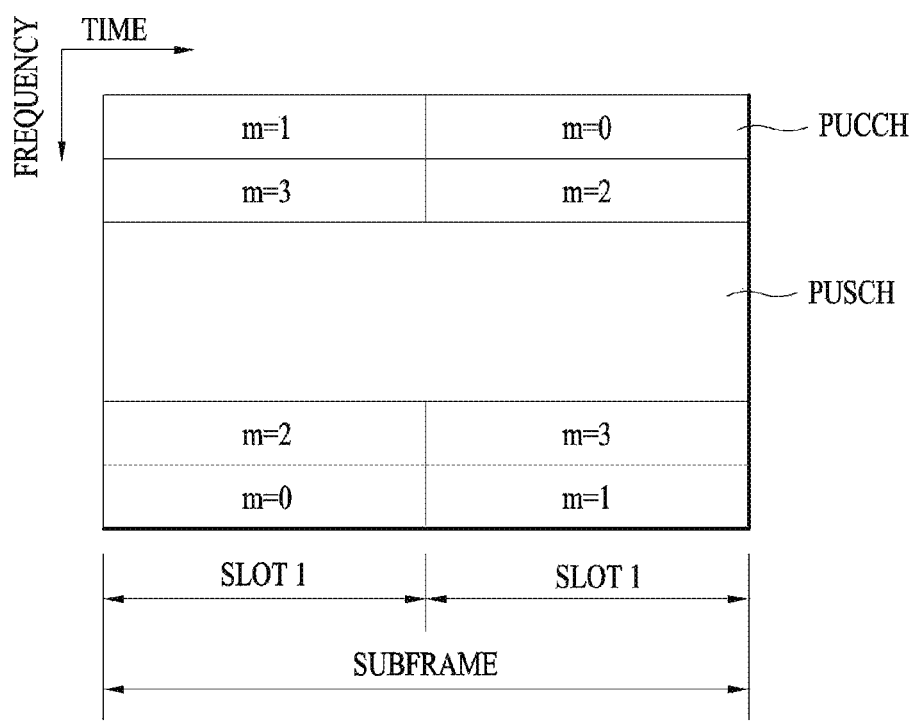
FIG. 5 illustrates a structure of an uplink subframe in the LTE system.

FIG. 5 is a diagram showing the structure of an uplink subframe used in an LTE system.

Figure 6:
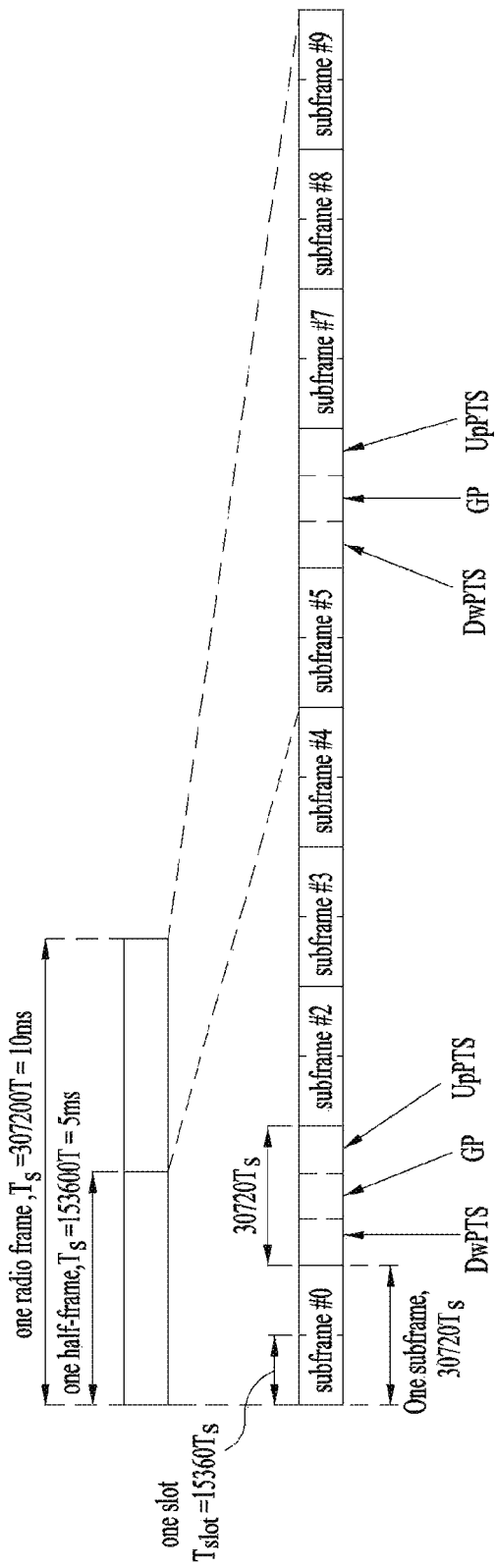
FIG. 6 is a diagram showing the structure of a radio frame used in an LTE TDD system.

Referring to FIG. 5, an uplink subframe may be divided into a region to which a Physical Uplink Control Channel (PUCCH) carrying uplink control information is allocated and a region to which a Physical Uplink Shared Channel (PUSCH) carrying user data is allocated. A middle portion of the subframe is allocated to the PUSCH and both sides of a data region in a frequency domain are allocated to the PUCCH. Uplink control information transmitted on the PUCCH includes an ACK/NACK signal used for HARQ, a Channel Quality Indicator (CQI) indicating a downlink channel status, a rank indicator (RI) for MIMO, a scheduling request (SR) which is an uplink radio resource allocation request, etc. The PUCCH for one UE uses one resource block occupying different frequencies in slots within the subframe. Two slots use different resource blocks (or subcarriers) within the subframe. That is, two resource blocks allocated to the PUCCH are frequency-hopped in a slot boundary. FIG. 6 shows the case in which a PUCCH having m=0, a PUCCH having m=1, a PUCCH having m=2, and a PUCCH having m=3 are allocated to the subframe.

A time period capable of transmitting a sounding reference signal in a subframe corresponds to a period at which the last symbol is positioned in time axis in the subframe. The sounding reference signal is transmitted through a data transmission band in frequency axis. Sounding reference signals of a plurality of UEs transmitted via the last symbol of the same subframe can be distinguished from each other according to a frequency position.

FIG. 6 is a diagram showing the structure of a radio frame in an LTE TDD system. In an LTE TDD system, the radio frame includes two half frames, each of which includes four normal subframes including two slots and a special subframe including a downlink pilot time slot (DwPTS), a guard period (GP), and an uplink pilot time slot (UpPTS).

In the special subframe, the DwPTS is used for initial cell search, synchronization and channel estimation at a user equipment. The UpPTS is used for channel estimation of a base station and uplink transmission synchronization of the user equipment. That is, the DwPTS is used for downlink transmission and the UpPTS is used for uplink transmission. In particular, the UpPTS is used for PRACH preamble or SRS transmission. The guard period is used to remove interference occurring in uplink due to multi-path delay of a downlink signal between uplink and downlink.

The special subframe is currently defined as shown in Table 1 below in the 3GPP standard. Table 1 shows the DwPTS and the UpPTS in case of $T_s=1/(15000\times2048)$. The remaining region is configured as a guard period.

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In the LTE TDD system, an uplink/downlink (UL/DL) configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2 above, D denotes a downlink subframe, U denotes an uplink subframe and S denotes the special subframe. Table 2 above shows a downlink-to-uplink switch-point periodicity in the UL/DL configuration in each system.

The aforementioned structure of the radio frame is just an example only. Hence, the number of subframes included in a radio frame, the number of slots included in one subframe, the number of OFDM symbols included in one slot may change in various ways.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 7:
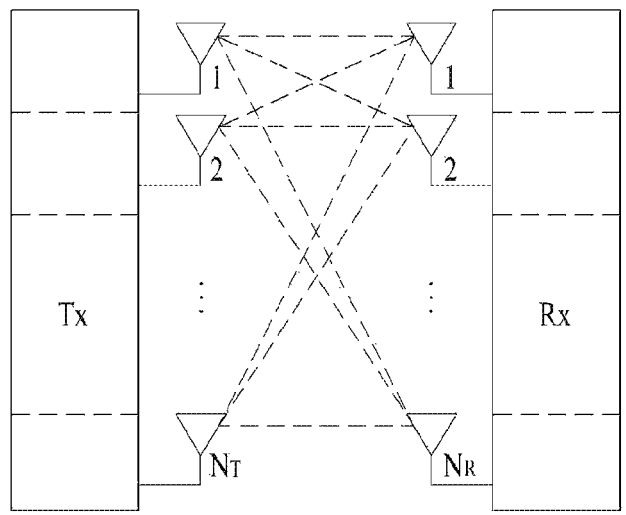
FIG. 7 is a diagram showing the configuration of a general multiple input multiple output (MIMO) system.

The configuration of the general multi-antenna (MIMO) communication system is shown in FIG. 7.

$N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in Equation 1 below. Here, $R_i$ is the smaller of the two values $N_T$ and $N_R$.

$$R_i = \min(N_T, N_R) \quad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 7, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in Equation 2 below.

$$s = [s_1, s_2, \ldots, s_{N_T}]^T \quad \text{[Equation 2]}$$

The transmitted information $s_1, s_2, \ldots, s_{N_T}$ may have different transmit powers. If the respective transmit powers are $P_1, P_2, \ldots, P_{N_T}$, the transmitted information with adjusted powers may be expressed by a vector shown in Equation 3 below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be expressed using a diagonal matrix P of the transmit powers as shown in Equation 4 below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Considers that the NT actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in Equation 5 below. Wij denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by Equation 6.

$$\text{rank}(H) \leq \min(N_T, N_R) \quad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by Equation 7 below.

$$\text{\# of streams} \leq \text{rank}(H) \leq \min(N_T, N_R) \quad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

A detailed description is now given of reference signals (RSs).

In general, a reference signal known to both a transmitter and a receiver is transmitted from the transmitter to the receiver for channel measurement together with data. This reference signal indicates a modulation scheme as well as a channel measurement scheme to perform a demodulation procedure. The reference signal is divided into a dedicated RS (DRS), i.e., a UE-specific RS, for a base station and a specific UE, and a common RS (CRS), i.e., a cell-specific RS, for all UEs in a cell. In addition, the cell-specific RS includes a reference signal for reporting CQI/PMI/RI measured by the UE to the base station, which is called a channel state information-RS (CSI-RS).

Meanwhile, unlike CRS, CSI-RS has been proposed above for PDSCH channel measurement, and can be defined as up to 32 different CSI-RS configurations to reduce inter-cell interference (ICI) in a multiple-cell environment.

The CSI-RS configuration differs depending on the number of antenna ports, and neighboring cells are configured to transmit CSI-RSs defined as different CSI-RS configurations as possible. Unlike CRS, CSI-RS supports up to 8 antenna ports, and a total of 8 antenna ports from antenna port 15 to antenna port 22 are allocated as antenna ports for CSI-RS in the 3GPP specification.

Now, a description of a Channel Status Information (CSI) report is given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI to obtain a multiplexing gain of MIMO antennas. To obtain CSI from the UE, the eNB allocates a PUCCH (Physical Uplink Control CHannel) or a PUSCH (Physical Uplink Shared Channel) to command the UE to feedback CSI for a downlink signal.

CSI is divided into three types of information: a Rank Indicator (RI), a Precoding Matrix Index (PMI), and a Channel Quality Indicator (CQI). First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of SINR.

Lastly, CQI is information indicating the strength of a channel and indicates a reception SINR obtainable when the eNB uses PMI.

As described above, CSI in the LTE system includes, but is not limited to, CQI, PMI, and RI. According to transmission mode of each UE, all or some of the CQI, PMI, and RI is transmitted. Periodic transmission of CSI is referred to as periodic reporting and transmission of CSI at the request of an eNB is referred to as aperiodic reporting.

In aperiodic reporting, a request bit included in uplink scheduling information transmitted by the eNB is transmitted to the UE. Then, the UE transmits CSI considering transmission mode thereof to the eNB through an uplink data channel (PUSCH). In periodic reporting, a period of CSI and an offset at the period are signaled in the unit of subframes by a semi-static scheme through a higher-layer signal per UE. The UE transmits CSI considering transmission mode to the eNB through an uplink control channel (PUCCH). If there is uplink data in a subframe in which CSI is transmitted, the CSI is transmitted through an uplink data channel (PUSCH) together with the uplink data.

The eNB transmits transmission timing information suitable for each UE to the UE in consideration of a channel state of each UE and a UE distributed situation in a cell. The transmission timing information includes a period and an offset necessary for transmitting CSI and may be transmitted to each UE through an RRC message.

Meanwhile, in a TDD system, in order to reduce feedback overhead using channel reciprocity of the TDD system, it may use CSI feedback that reports CQI only without reporting PMI/RI. In particular, it may estimate a downlink channel using an SRS (sounding reference signal) transmitted in uplink without making a feedback on PMI/RI and a channel estimate value obtained by the SRS is compensated through a relatively simple CSI feedback. This is because an impact of downlink interference is not reflected to the downlink channel estimated by the SRS. In general, such a relation as equation 8 shown in the following is satisfied between the downlink channel estimated by the SRS and an actual downlink channel.

$$\tilde{H} = \alpha H \qquad \text{[Equation 8]}$$

In equation 8, $\tilde{H}$ corresponds to a downlink channel estimated using an SRS, $\alpha$ corresponds to a complex constant, and H corresponds to an actual downlink channel. In this case, a UE can transmit CQI calculated by equation 9 shown in the following under the assumption that a PDSCH transmission mode corresponds to transmit diversity (TxD). In particular, equation 9 illustrates a TxD-based CQI calculation method.

$$CQI = \frac{|\tilde{H}|^2}{I} \qquad \text{[Equation 9]}$$

In equation 9, I corresponds to a value indicating interference power. As shown in equation 10 in the following, an eNB can estimate an actual downlink channel using a downlink channel estimated by an SRS and CQI received from a UE.

$$\hat{H} = \tilde{H}\frac{\sqrt{CQI}}{|\tilde{H}|} = \frac{\alpha}{|\alpha|}\frac{1}{\sqrt{I}}H \qquad \text{[Equation 10]}$$

As shown in equation 10, if CQI is calculated using a compensated actual downlink channel $\hat{H}$, it may be able to calculate CQI to which downlink interference is reflected according to equation 11 in the following.

$$CQI = |\hat{H}|^2 = \frac{|H|^2}{I} \qquad \text{[Equation 11]}$$

However, in case of an IRC (Interference Rejection Combiner) UE that rejects an interference signal by reception beamforming, the aforementioned TxD-based CQI calculation method may cause a downlink channel estimation error. Referring to equation 9, a UE performs MRC (Maximum Ratio Combining) on a channel estimated by an SRS corresponding to a reference signal. As a result, as shown in equation 11, the UE is able to obtain a CQI value to which downlink interference is reflected. However, If IRC beamforming is performed, a CQI numerator of equation 9 does not satisfy $|H|^2$ anymore and equation 11 is not satisfied. Instead, as shown in equation 12, there is a difference between a size $|\hat{H}|_2$ of a channel estimated by an eNB and a size of a reported actual channel (i.e., CQI) as much as ε.

$$CQI = \frac{|H|^2}{I} + \varepsilon = |\hat{H}|^2 + \varepsilon \qquad \text{[Equation 12]}$$

Hence, it may be difficult for the eNB to perform data transmission with an optimized MCS (Modulation and Coding Scheme). Of course, since CQI has a quantization error, equation 11 also has an error. However, since the IRC UE has an additional error due to the IRC beamforming, it may be more difficult for the eNB to find out the optimized MCS.

In order to solve the problem above, the present invention proposes that a UE calculates and reports single antenna port transmission scheme based CQI rather than TxD based CQI.

Specifically, an eNB applies a different precoding vector to each antenna port of a CSI-RS (or CRS) and transmits it to a UE. The eNB can autonomously determine precoding vectors in consideration of a downlink channel between the eNB and UEs of the eNB. Or, the eNB may use a set of precoding vectors which are fixed irrespective of a channel.

For example, when an eNB has 64 antennas, the eNB sets 8-port CSI-RS to a UE and transmits 8 different PMIs (64 by 1 vector) to each antenna port as a precoder. In this case, the UE does not know which PMI is used or whether or not precoding is applied to each antenna port. If necessary, it may be able to signal the UE that precoding is applied to an antenna port from which a CSI-RS or a CRS is transmitted together with a reference signal configuration. The eNB assumes that the UE is able to select a PMI from among the 8 PMIs as a preferred PMI having higher correlation with a dominant Eigen vector of a downlink channel.

In a CSI mode not reporting PMI/RI, i.e., in a PMI/RI off mode, the UE assumes each of a plurality of antenna ports set to the UE as an independent single antenna port and calculates a single antenna port transmission based CQI according to an antenna port.

Or, irrespective of the PMI/RI off mode, if the eNB signals the UE that precoding is applied to a CSI-RS antenna port or a CRS antenna port, the UE assumes each of a plurality of the antenna ports as an independent single antenna port and calculates a single antenna port transmission based CQI according to an antenna port.

Or, the eNB may directly indicate the UE to calculate a single antenna port transmission based CQI for a reference signal defined by a plurality of antenna ports.

The UE can select N number of best CQIs (e.g., best SINR or best spectral efficiency) from among CQIs calculated by the single antenna port transmission based CQI calculation method and report the N number of CQIs to the eNB. In this case, the UE can also report antenna port indexes of the N number of CQIs to the eNB.

The eNB can determine the N and semi-statically or dynamically signal the N to the UE. Or, the UE can autonomously determine the N and report the determined N to the eNB together with CQI. When the eNB receives a report on antenna port indexes from the UE, since the eNB is aware of precoding applied to antenna ports, the eNB is able to know precoding and CQI reported by the UE.

According to the present invention, since CQI reported by the UE corresponds to CQI for an effective channel to which precoding is already added, when the eNB uses a precoder identical to a precoder, which is assumed at the time of calculating the CQI, to transmit an actual signal, the eNB may use the precoder as it is without separate CQI compensation. On the contrary, when the eNB uses a precoder different from the precoder, which is assumed at the time of calculating the CQI, as shown in equations 13 and 14, the eNB may perform separate CQI compensation. Equation 13 shows CQI reported by the UE and equation 14 shows a compensation procedure of the reported CQI.

$$\text{Reported } CQI_n = \frac{(u_n HP_n)^H (u_n HP_n)}{(u_n i)^H (u_n i)} \qquad \text{[Equation 13]}$$

In equation 13, i corresponds to the sum of interference power and noise power in the UE and $P_n$ corresponds to a precoder applied to $n^{th}$ CSI-RS antenna port. And, $HP_n$ corresponds to a downlink channel measured via the $n^{th}$ CSI-RS antenna port and $u_n$ corresponds to a beamforming vector when the $P_n$ is applied.

$$\text{Recalculated } CQI_n = \text{Reported } CQI_n \cdot \frac{|\tilde{H}P_m|}{|\tilde{H}P_n|} = \qquad \text{[Equation 14]}$$

$$\frac{(u_n HP_n)^H (u_n HP_n)}{(u_n i)^H (u_n i)} \cdot \frac{|\tilde{H}P_m|}{|\tilde{H}P_n|} \approx \frac{(u_m HP_m)^H (u_m HP_m)}{(u_m i)^H (u_m i)}$$

Equation 14 includes an approximation procedure. If a precoder assumed at the time of calculating CQI and a practically using precoder indicate a similar direction in a spatial domain (i.e., if correlation is high), an error according to the approximation of equation 14 is sufficiently tight. On the contrary, If a precoder assumed at the time of calculating CQI and a practically using precoder indicate a considerably different direction in a spatial domain (i e, if correlation is low), an error according to the approximation of equation 14 is rough.

And, if the eNB performs SU-MIMO transmission, it is highly probable that the eNB uses the reported $P_n$ as it is. Hence, the reported CQI is used without separate compensation. On the contrary, if the eNB performs MU-MIMO transmission, it is highly probable that the eNB does not use the reported $P_n$ as it is in consideration of interference of the co-scheduled UE. In this case, it is necessary to perform compensation shown in equation 14 and correlation between $P_n$ and $P_m$ is might be high. This is because the UE reports the N number of CQIs for the N number of antenna ports and correlation is high between at least one of the N number of precoders and the $P_m$ corresponding to an actual precoder.

In the foregoing description, the UE reports CQI together with a corresponding antenna port index to the eNB. Unlikely, the UE may report the CQI only and the antenna port index can be estimated by the eNB. If a difference between the timing of estimating a downlink channel estimated by the eNB from an SRS and the timing of calculating CQI of the downlink channel calculated by the UE from a CSI-RS is not big (i.e., if channel aging is not performed), the UE and the eNB calculate CQI for the same downlink channel (i.e., time static downlink channel). Hence, although the eNB is not aware of a value of the CQI, the eNB can order antenna ports from an antenna port that achieves a highest CQI to an antenna port that achieves a lowest CQI in a state that each UE does not consider reception interference. As a result, the UE selects N number of best CQIs and reports the N number of CQIs to the eNB in a determined order. The eNB can map an antenna port to CQI.

However, similar to an MMSE (minimum mean square error)-IRC receiver, if the UE calculates reception beamforming of the UE maximizing SINR in consideration of not only a channel of the UE but also a reception interference channel, the eNB is unable to estimate an antenna port index. This is because, although the UE calculates reception beamforming in consideration of the reception interference channel and estimates the reception SINR, it is necessary for the eNB to estimate reception SINR using a desired downlink channel only, since the eNB is unaware of the reception interference channel of the UE. Hence, it is preferable for the IRC UE to additionally report an antenna port index.

Or, the UE should calculate CQI in a state that the UE turns off an IRC function of the UE to enable the eNB to perform mapping between CQI and an antenna port while an antenna port index is not reported. To this end, the eNB can directly signal the UE to calculate CQI in a state that the IRC function of the UE is turned off or indicate the UE to calculate single antenna port transmission based CQI via the aforementioned various schemes. Then, the UE is restricted to calculate CQI in the state that the IRC function of the UE is turned off. Or, when CQI is calculated, the UE may autonomously determine whether to turn on/off the IRC function and report the determination to the eNB.

When the eNB performs high rank MIMO transmission based on CQI, the eNB can performs the transmission after CQI compensation is performed. In the following, for clarity, rank 2 transmission is assumed. Yet, the similar scheme can also be applied to rank 3 or higher.

If rank 2 PMI corresponds to $[P_k\ P_n]$, the rank-2 PMI is compensated by reflecting interlayer interference to $k^{th}$ antenna port of a reference signal, $CQI_k$ for $n^{th}$ antenna port, and $CQI_n$. If CQI compensation for rank M MIMO transmission is incorrect, the UE calculates M antenna port transmission based CQI and reports the calculated CQI to the eNB. For example, if the eNB has 64 antennas, the eNB sets 8-port CSI-RS to the UE and sequentially binds M number of antenna ports as an antenna port group to form 8/M number of groups in total. The eNB applies a different PMI (64 by M matrix) to each group to perform transmission.

In PMI/RI off mode, the UE divides a plurality of antenna ports set to the UE by a unit of M number of antenna port groups and calculates M antenna port transmission based CQI according to an antenna port group. In this case, the UE calculates two CQIs corresponding to two codewords (or two transport blocks) according to an antenna port group under the assumption that the eNB uses a unit matrix of M by M size as a precoder. The UE can select CQIs of N number of best groups from among CQIs of the 8/M number of calculated groups (rank M) and report the selected CQIs to the eNB. In this case, the UE can also report antenna port group index. Since each CQI is calculated under the assumption of M layer transmission, interlayer interference is reflected to all CQIs.

According to the present invention, a reference signal including a plurality of antenna ports is set to the UE and the UE calculates and reports CQI for the reference signal. Yet, a plurality of reference signals each of which includes a plurality of antenna ports can be set to the UE and the present invention can be applied to each of a plurality of the reference signals. Or, if a different single antenna port CSI-RS or a plurality of CSI processes including a different M antenna port CSI-RS is set, the UE may be able to perform the same operation by reporting a CSI process index instead of an antenna port index. In this case, a CSI process corresponds to an operation of providing a feedback on channel information with an independent feedback configuration. One or more CSI processes may exist in a serving cell.

Meanwhile, when CQI is calculated for the rank-M MIMO transmission, the eNB can determine M in a form described in the following and informs the UE of the N. Or, the UE may determine the N and informs the eNB of the N.

When the eNB determines the M, the eNB determines the M with reference to size distribution of Eigen values, UE geometry, and the like by performing SVD (singular value decomposition) on a downlink channel between the eNB and the UE. Subsequently, the eNB semi-statically informs the UE of the M via RRC signaling or the eNB dynamically informs the UE of the M via DCI. If the M is informed via RRC signaling, a parameter for indicating the M can be added to the CSI-RS configuration.

When the M is determined by the eNB, the eNB may determine the M by a sub-optimal value while failing to consider a size of downlink interference that affects the UE. In this case, the UE may determine the M and inform the eNB of the determined M. To this end, CSI feedback is managed in a manner of being divided into an RI reporting period (long term) and a CQI reporting period (short term).

And, the eNB can separately manage a CSI-RS_RI for RI reporting of the UE and a CSI-RS_CQI for CQI reporting. The eNB transmits the CSI-RS_RI by applying random precoding based on a channel estimated from an SRS. For example, the random precoding is performed in a manner that the eNB performs SVD on a downlink channel calculated from an SRS, sequentially selects n number of vectors from right singular vector corresponding to a big singular value, and respectively applies the selected n number of vectors to n number of CSI-RS_RI antenna ports as precoders. In this case, n corresponds to the maximum rank capable of being reported by the UE. The eNB and the UE assume that $n^{th}$ dominant singular vector is applied to an $n^{th}$ antenna port. Subsequently, the UE determines a rank in consideration of a channel estimated by each antenna port of CSI-RS_RI, interference, and an amount of noise. In particular, the UE has n number of channels corresponding to the n number of antenna ports and determines channels on which an independent layer is to be received from a first channel estimated by the first antenna port. In other word, when the UE calculates transmission amount by assuming rank m, the UE combines a unit matrix of m by m size with a zero matrix of m by (n−m) size and assumes it as a precoder to calculate the transmission amount. The combination of the matrixes corresponds to [A B] when there are matrixes A and B. A new matrix is generated by arranging two matrixes in horizontal direction.

After the RI is calculated using the CSI-RS_RI, the UE provides a feedback on the RI to the eNB. Subsequently, the eNB performs precoding on the CSI-RS_CQI using a channel estimated from the RI and the SRS. As mentioned in the foregoing description, the UE calculates M antenna port transmission based CQI based on the CSI-RS_CQI and provides a feedback on the calculated M antenna port transmission based CQI to the eNB.

Figure 8:
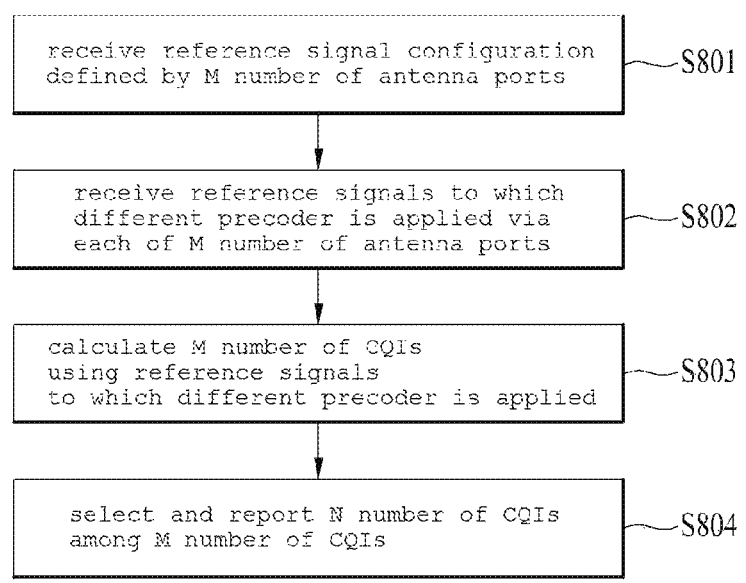
FIG. 8 is a flowchart for a procedure of calculating M-antenna port transmission based CQI according to embodiments of the present invention.

FIG. 8 is a flowchart for a procedure of calculating M-antenna port transmission based CQI according to embodiments of the present invention.

Referring to FIG. 8, in the step S801, the UE receives a reference signal configuration defined by M number of antenna ports via higher layer. In this case, the UE may receive an indication indicating that the CQI is reported without reporting a precoder and a rank indicator. Or, the UE may additionally receive information on whether or not a different precoder is applied to each of reference signals received via the M number of antenna ports.

Subsequently, in the step S802, the UE receives reference signals to which a different precoder is applied from the eNB via each of the M number of antenna ports. In the step S803, the UE calculates M number of CQIs using the reference signals to which the different precoder is applied. In addition, the UE selects N number of CQIs from among the M number of CQIs in an order of good channel quality.

Lastly, in the step S804, the UE reports the N number of CQIs to the eNB among the M number of CQIs. In this case, the UE can also report an antenna port index corresponding to each of the N number of CQIs.

Figure 9:
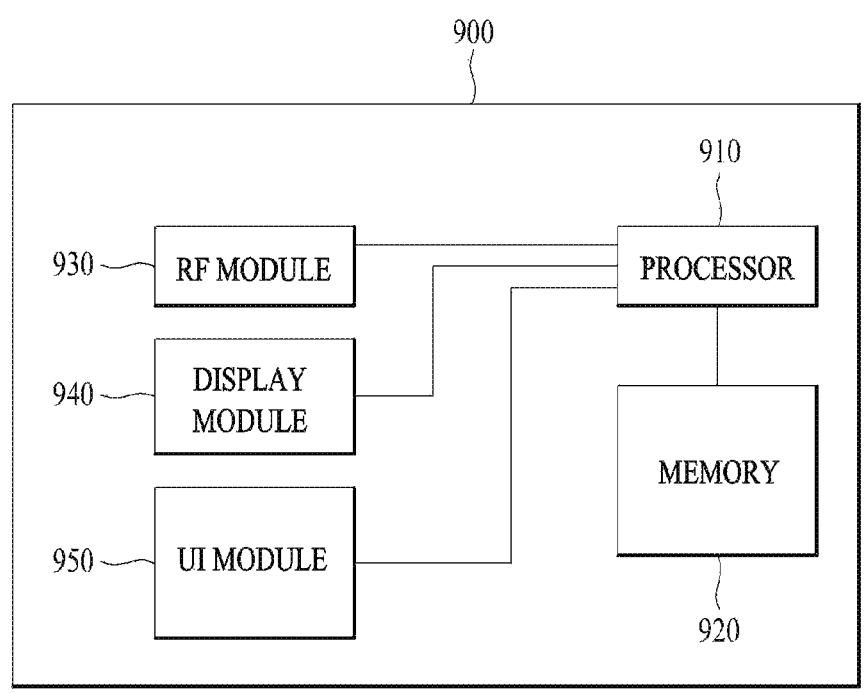
FIG. 9 is a block diagram of a communication apparatus according to one embodiment of the present invention.

FIG. 9 is a block diagram of a communication apparatus according to one embodiment of the present invention.

Referring to FIG. 9, a communication apparatus 900 includes a processor 910, a memory 920, a Radio Frequency (RF) module 930, a display module 940 and a user interface module 950.

The communication apparatus 900 is shown for convenience of description and some modules thereof may be omitted. In addition, the communication apparatus 900 may further include necessary modules. In addition, some modules of the communication apparatus 900 may be subdivided. The processor 910 is configured to perform an operation of the embodiment of the present invention described with reference to the drawings. For a detailed description of the operation of the processor 910, reference may be made to the description associated with FIGS. 1 to 8.

The memory 920 is connected to the processor 910 so as to store an operating system, an application, program code, data and the like. The RF module 930 is connected to the processor 910 so as to perform a function for converting a baseband signal into a radio signal or converting a radio signal into a baseband signal. The RF module 930 performs analog conversion, amplification, filtering and frequency up-conversion or inverse processes thereof. The display module 940 is connected to the processor 910 so as to display a variety of information. As the display module 940, although not limited thereto, a well-known device such as a Liquid Crystal Display (LCD), a Light Emitting Diode (LED), or an Organic Light Emitting Diode (OLED) may be used. The user interface module 950 is connected to the processor 910 and may be configured by a combination of well-known user interfaces such as a keypad and a touch screen.

The above-described embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although a method of reporting channel quality information in a TDD type wireless communication system and an apparatus therefor are described with reference to examples applied to 3GPP LTE system, it may be applicable to various kinds of wireless communication systems as well as the 3GPP LTE system.

What is claimed is:

1. A method of reporting channel status information (CSI) to a base station (BS) by a user equipment (UE), capable of calculating a precoding matrix index (PMI), a rank indicator (RI) and channel quality information (CQI), in a multi-antenna based wireless communication system that includes a base station (BS), the method comprising:
   receiving precoded reference signals via a plurality of antenna ports from the BS;
   based on the received precoded reference signals, calculating CQI for a rank; and
   reporting the CQI to the BS without reporting any PMI, wherein the CQI is calculated by the UE on the assumption that the received precoded reference signals have been precoded using an identity matrix.

2. The method of claim 1, wherein in the at least one antenna group includes two or more antenna groups.

3. The method of claim 2, wherein the CQI reported to the BS corresponds to one of the two or more antenna groups.

4. The method of claim 2, wherein the CQI reported to the BS corresponds to each of the two or more antenna groups.

5. The method of claim 1, wherein, when the transmission rank is M, the identity matrix has M×M size.

6. The method of claim 1,
   wherein the reference signals are channel status information—reference signals (CSI-RSs), and
   wherein the multi-antenna based wireless communication system corresponds to a Time Division Duplex (TDD) communication system.

7. The method of claim 1, wherein the rank corresponds to a group of the plurality of antenna ports used to receive the precoded reference signals.

8. The method of claim 1, wherein the rank comprises plural ranks, the plural ranks corresponding to respective groups of the plurality of antenna ports.

9. The method of claim 1, wherein the calculating CQI for a rank comprises calculating CQI for any of the plurality of antenna ports corresponding to the rank.

10. The method of claim 1,
wherein the rank corresponds to a group of the plurality of antenna ports used to receive the precoded reference signals, and
wherein the calculating CQI for a rank comprises calculating CQI for each rank of the plurality of antenna ports.

11. A user equipment (UE) capable of calculating a precording matrix index (PMI), a rank indicator (RI) and channel quality information (CQI), in a multi-antenna based wireless communication system, the UE comprising:
a radio frequency (RF) unit including a transceiver; and
a processor connected with the RF unit and configured to:
receive precoded reference signals via a plurality of antenna ports from the BS;
based on the received precoded reference signals, calculate CQI for a rank; and
report the CQI to the BS without reporting any PMI,
wherein the CQI is calculated by the UE on the assumption that the received precoded reference signals have been precoded using an identity matrix.

12. The UE of claim 11, wherein in the at least one antenna group includes two or more antenna groups.

13. The UE of claim 12, wherein the CQI reported to the BS corresponds to one of the two or more antenna groups.

14. The UE of claim 12, wherein the CQI reported to the BS corresponds to each of the two or more antenna groups.

15. The UE of claim 11, wherein, when the transmission rank is M, the identity matrix has M×M size.

16. The UE of claim 11,
wherein the reference signals are channel status information—reference signals (CSI-RSs), and
wherein the multi-antenna based wireless communication system corresponds to a Time Division Duplex (TDD) communication system.

17. The UE of claim 11, wherein the rank corresponds to a group of the plurality of antenna ports used to receive the precoded reference signals.

18. The UE of claim 11, wherein the rank comprises plural ranks, the plural ranks corresponding to respective groups of the plurality of antenna ports.

19. The UE of claim 11, wherein the calculating CQI for a rank comprises calculating CQI for any of the plurality of antenna ports corresponding to the rank.

20. The UE of claim 11,
wherein the rank corresponds to a group of the plurality of antenna ports used to receive the precoded reference signals, and
wherein the calculating CQI for a rank comprises calculating CQI for each rank of the plurality of antenna ports.

21. A processor configured to be installed in a user equipment in a multi-antenna based wireless communication system that includes a base station (BS), the processor capable of calculating a precoding matrix index (PMI), a rank indicator (RI) and channel quality information (CQI), the processor configured to execute instructions for:
receiving precoded reference signals from the BS via a plurality of antenna ports;
based on the received precoded reference signals, calculating CQI for a rank; and
reporting the CQI to the BS without reporting any PMI,
wherein the CQI is calculated by the UE on the assumption that the received precoded reference signals have been precoded using an identity matrix.

* * * * *